United States Patent
Chopra et al.

(10) Patent No.: US 10,146,668 B1
(45) Date of Patent: Dec. 4, 2018

(54) MODELING CODE COVERAGE IN SOFTWARE LIFE CYCLE

(71) Applicant: EMC Corporation, Hopkinton, MA (US)

(72) Inventors: Shelesh Chopra, Karnataka (IN); Cazeeta Almeida, Karnataka (IN); Sudha Narayanan, Karanataka (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 9 days.

(21) Appl. No.: 14/136,177

(22) Filed: Dec. 20, 2013

(51) Int. Cl.
*G06F 11/36* (2006.01)

(52) U.S. Cl.
CPC .............................. *G06F 11/3676* (2013.01)

(58) Field of Classification Search
CPC .................................................. G06F 11/3676
USPC ......................................................... 717/124
See application file for complete search history.

(56) References Cited

U.S. PATENT DOCUMENTS

| | | | | |
|---|---|---|---|---|
| 5,737,609 A * | 4/1998 | Reed | ................... | G06F 11/3684 717/126 |
| 5,805,795 A * | 9/1998 | Whitten | ........................ | 714/38.1 |
| 6,986,125 B2 * | 1/2006 | Apuzzo | ............... | G06F 11/3684 717/124 |
| 7,886,272 B1 * | 2/2011 | Episkopos | .......... | G06F 11/3696 717/124 |
| 8,627,287 B2 * | 1/2014 | Fanning et al. | ............... | 717/124 |
| 9,135,405 B2 * | 9/2015 | Brumley | ................. | G06F 21/00 |
| 2004/0107415 A1 * | 6/2004 | Melamed | ............ | G06F 11/3684 717/124 |
| 2008/0148236 A1 * | 6/2008 | Huang | ................ | G06F 11/3684 717/124 |
| 2009/0144698 A1 * | 6/2009 | Fanning | .................... | G06F 8/75 717/120 |
| 2009/0282307 A1 * | 11/2009 | Chaturvedula | ............................ | G01R 31/318314 714/738 |
| 2010/0180258 A1 * | 7/2010 | Takahashi | ...................... | 717/124 |
| 2013/0006683 A1 * | 1/2013 | Rao | ........................ | G06Q 10/06 705/7.11 |
| 2013/0085741 A1 * | 4/2013 | Segall | ................. | G06F 11/3676 703/21 |
| 2013/0111267 A1 * | 5/2013 | Beryoza | .............. | G06F 11/3688 714/32 |

(Continued)

OTHER PUBLICATIONS

Li et al., "Code-coverage guided prioritized test generation", Aug. 2006, Elsevier (Year: 2006).*

(Continued)

*Primary Examiner* — Wei Y Zhen
*Assistant Examiner* — Junchun Wu
(74) *Attorney, Agent, or Firm* — Polsinelli PC

(57) ABSTRACT

A code coverage tool applies predefined rules applicable to user input to determine a test scenario from predefined test cases to best achieve a code coverage goal. For example, the code coverage goal may specify a target percentage of code coverage for areas, functions, conditions, or statement of interest to the user. The user input may select built-in rules or user supplied rules, and the user input may specify areas or functions that are mapped to the test cases. The built-in rules prioritize selected test cases for execution at run time to provide code coverage maximization with minimum utilization of resources. The user input may also specify a type of coverage, a test case priority, and a test case type.

19 Claims, 6 Drawing Sheets

(56) References Cited

U.S. PATENT DOCUMENTS

| | | | | |
|---|---|---|---|---|
| 2014/0040867 A1* | 2/2014 | Wefers | ................ | G06F 11/3684 |
| | | | | 717/131 |
| 2014/0101640 A1* | 4/2014 | Romdhane | .......... | G06F 11/3684 |
| | | | | 717/125 |
| 2014/0245264 A1* | 8/2014 | Bartley | ..................... | G06F 8/70 |
| | | | | 717/124 |
| 2014/0351793 A1* | 11/2014 | Bartley | ............... | G06F 11/3676 |
| | | | | 717/124 |
| 2015/0007140 A1* | 1/2015 | Boshernitsan | ...... | G06F 11/3688 |
| | | | | 717/124 |
| 2015/0169432 A1* | 6/2015 | Sinyagin | ............ | G06F 11/3684 |
| | | | | 717/124 |

OTHER PUBLICATIONS

Rolland et al., "Guiding Goal Modeling Using Scenarios", Dec. 1998, IEEE, vol. 24, No. 12 (Year: 1998).*

Rothermel et al., "Prioritizing Test Cases for Regression Testing", Oct. 2001, vol. 27, No. 10 (Year: 2001).*

Li et al., "Search Algorithms for Regression Test Case Prioritization", Apr. 2007, vol. 33, No. 4 (Year: 2007).*

* cited by examiner

| Sin. | Test Case Steps | Expected Result |
|---|---|---|
| 1 | 1. Take a Backup of a client with one saveset. | Backup should be successful |
| 2 | 1. Take a Backup of a client with one saveset.<br>2. Once backup is successful. Run file level recover with command line. | Backup should be successful<br>File level recover using command-line should be successful |
| 3 | 1. Take a Backup of a client with multiple savesets.<br>2. Once backup is successful. Manually clone the savesets to a secondary device.<br>3. Run recover of all the savesets | Backup should be successful<br>Cloning of the savesets should be successful<br>Recover of all the savesets should be successful |
| 4 | 1. Take a Backup of a client with multiple savesets by enabling auto-clone feature.<br>2. Recover data from the primary device as well as the secondary device. | Backup should be successful<br>Cloning of the savesets should be successful<br>Recover of all the savesets from primary device as well as secondary device should be successful |
| 5 | 1. Take backup of multiple clients with multiple savesets by enabling auto-clone feature.<br>2. Run File level recovery as well as image level recovery of every saveset.<br>3. Run Redirected restore & relocated restore | Backup should be successful<br>Cloning of the savesets should be successful<br>Recover of all the savesets from primary device as well as secondary device should be successful. Redirected restore and relocated restore should be successful |
| 6 | 1. Take a Backup of a client with multiple savesets to different types of devices (File type devices, AFTD, Data Domain, Tape etc)<br>2. Run File level recovery as well as image level recovery of every saveset. | Backup should be successful with all types of devices.<br>File level recovery & Image level recovery should be successful with all types of devices. |

FIG. 6

MODELING CODE COVERAGE IN SOFTWARE LIFE CYCLE

FIELD OF THE INVENTION

The various embodiments described herein relate generally to a code coverage tool for testing computer software, and in particular a code coverage tool having a rule-based system for intelligent code coverage testing.

BACKGROUND

Code coverage testing is a way of performing test runs of computer software while insuring that the test runs actually test all or a substantial portion of the executable files, functions, conditions, or statements in the computer software. Code coverage testing is required for certain critical applications, such as aviation software. See Software Verification Tools Assessment Study, DOT/FAA/AR-006/54, June 2007, 139 pages, U.S. Department of Transportation, Federal Aviation Administration, Washington, D.C., incorporated herein by reference in its entirety.

For less critical applications, some degree of code coverage testing is desired in order to reduce customer complaints when software crashes due to fatal execution errors. Depending on the size and complexity of the applications, the less critical applications may not justify testing for all of the combinations of conditions that may be required for critical applications. Testing for all combinations of conditions is relatively expensive in terms of labor and processing time for large or complex applications. Exhaustive testing may also delay the introduction of new software or software updates to replace or repair old software that is less reliable.

BRIEF DESCRIPTION OF THE DRAWINGS

Various embodiments in accordance with the present disclosure will be described with reference to the drawings, in which:

FIG. 6 is a table of test case scenarios from which the intelligent code coverage tool of FIG. 2 selects a particular test case scenario for code coverage testing of a data storage application.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Although the process flows shown in the figures or contained in following description may depict functional operations in a particular sequence, the processes are not necessarily limited to the particular order or operations illustrated. One skilled in the art will appreciate that the various operations portrayed in the figures can be changed, rearranged, performed in parallel or adapted in various ways. Furthermore, it is to be understood that certain operations or sequences of operations can be added to or omitted from the processes, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

Figure 1:
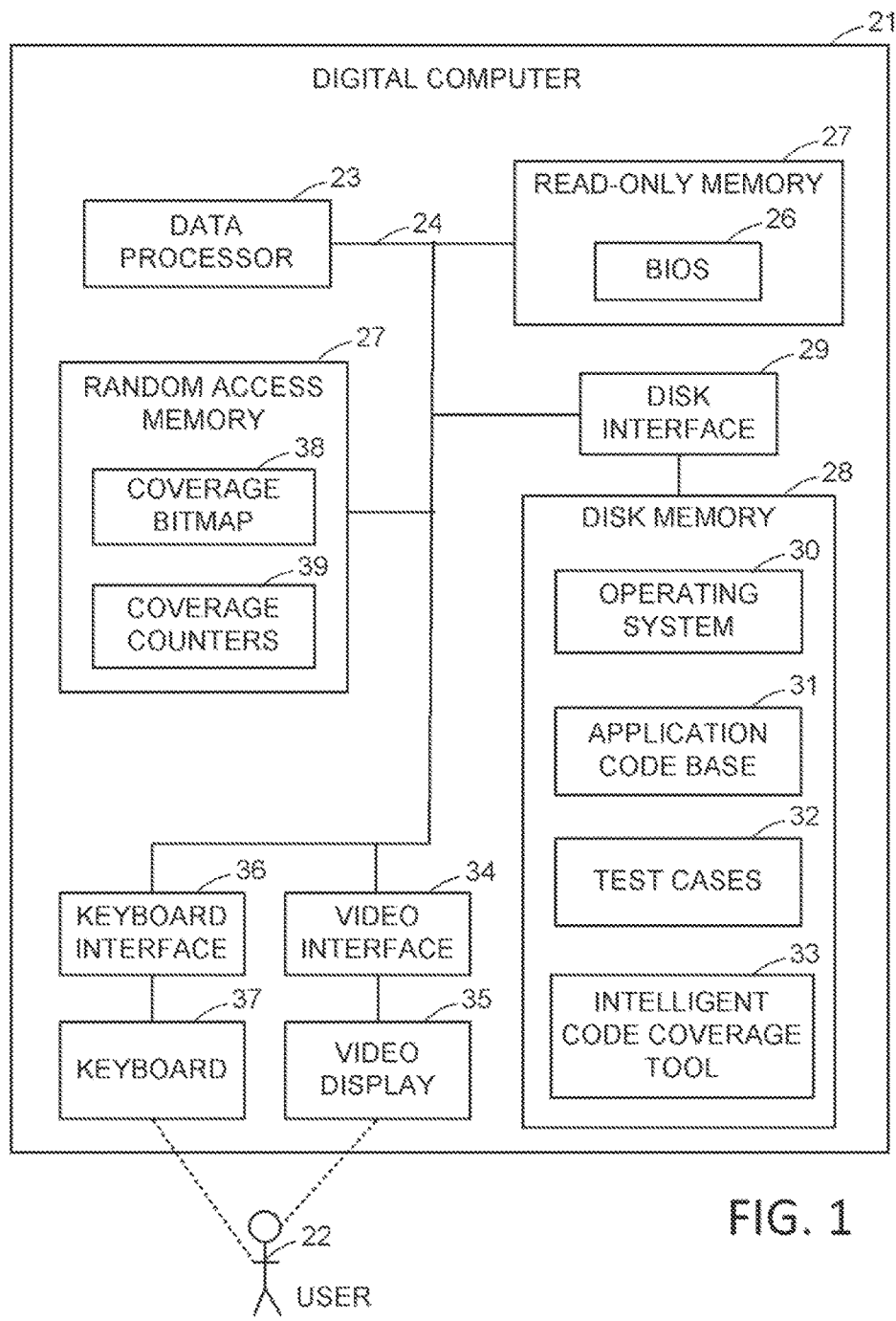
FIG. 1 illustrates a digital computer configured for software development and testing.

FIG. 1 shows a digital computer 21 operated by a human user 22 to perform code coverage testing. For example, the digital computer 21 is a personal computer or workstation. The computer 21 has a data processor 23, which may contain multiple core CPUs and cache memory shared among the core CPUs. The data processor 23 has a system bus 24. The system bus 24 can be any of several types of bus structures including a memory bus or memory controller, a peripheral bus, and a local bus using any of a variety of bus architectures.

Basic input/output routines (BIOS) 25 stored in read-only memory 26 help to transfer information between elements within the computer 21, such as during start-up. The computer 21 also has random access memory 27, and computer-readable storage media such as disk memory 28 coupled to the system bus 24 via a disk interface 29. The disk memory 28 stores an operating system 30, an application code base 31, test cases 32, and an intelligent code coverage tool 33 in accordance with the present disclosure. The computer 21 also has a video interface 34 to a video display 35, and a keyboard interface 36 to a keyboard 37.

For code coverage testing of programs in the application code base 31, the code coverage tool 33 has intelligence for determining an appropriate test case scenario from pre-defined test cases in order to maximize the coverage while minimizing processing time and resources. For example, the test case scenario is a selected test case or a selected sequence of the test cases, which may be modified by changing default parameters of the test cases. The intelligence is encoded in predefined rules, and the test case scenario is determined by applying the predefined rules that are applicable to input data from a user. The code coverage tool 33 can prioritize test case runs at runtime, based on configuration parameters. The code coverage tool 33 may also customize options for reducing user intervention while also providing user flexibility in adapting the code coverage tool 33 to different programming environments and application domains.

The advantages of the intelligent code coverage tool 33 provide an economical option to begin code coverage testing at an early stage in software development rather than delaying until just before the release of each version of the software. Therefore bugs are found and fixed early in each release cycle, and the product releases occur in a more predictable and timely fashion. Ultimately, code coverage will not be seen as an activity separate from software testing or software development.

In one mode of operation, the user performs an initial configuration of the application program environment, and maps test cases for the application program to specific areas and functions. The user then invokes various mechanisms of the intelligent code coverage tool to select and run a series of the test cases. The mapping of areas and functions to test cases provides a way of running code coverage testing more effectively for bug fixes and other changes to specific areas and functions of the application software.

There are at least two methodologies of running code coverage test cases through the intelligent code coverage tool. One methodology is an intelligent and automatic run using built-in rules of the intelligent code coverage tool. The built-in rules are applied in order to select and run a test case scenario for code coverage maximization with minimum utilization of resources. Another methodology is a manual run using a set of user-defined rules about how the user prefers the code coverage test cases to be run. Combinations of manual and automatic methodologies may also be sued.

For any particular code coverage run, the user may specify target percentages (e.g., 70%) of code coverage for functions, conditions, or statements, and the run terminates once the run achieves the specified target percentages. During any code coverage run, a coverage bitmap 38 is maintained in the random access memory 27. The code coverage run sets a respective bit in the coverage bitmap 38 to record that a function, condition, or statement of interest has been executed or achieved during the code coverage run.

If a percentage of code coverage is of interest for the functions, conditions, or statements of interest, then one or more coverage counters 39 may be maintained in the random access memory 27. For example, a coverage counter for the functions of interest is initially set to zero at the very beginning of a code coverage run, and this coverage counter for the functions is incremented by one for each function of interest that has been executed during the run. At the end of the run, the percentage of code coverage is computed by dividing the code coverage count for the functions by the total number of the functions, and multiplying the quotient by one-hundred. The coverage counter can be incremented either dynamically during the run whenever a function of interest is executed for the first time during the run, or the coverage counter can be incremented at the end of the run (or when the run is temporarily suspended) while scanning the bits in the coverage bitmap 36 for the functions of interest. For example, so long as there is no desire to terminate the run as soon as a coverage percentage has been reached, the coverage counter is incremented at the end of the run while scanning the bits in the coverage bitmap 36 to count the number of bits that have been set for the functions of interest.

Figure 2:
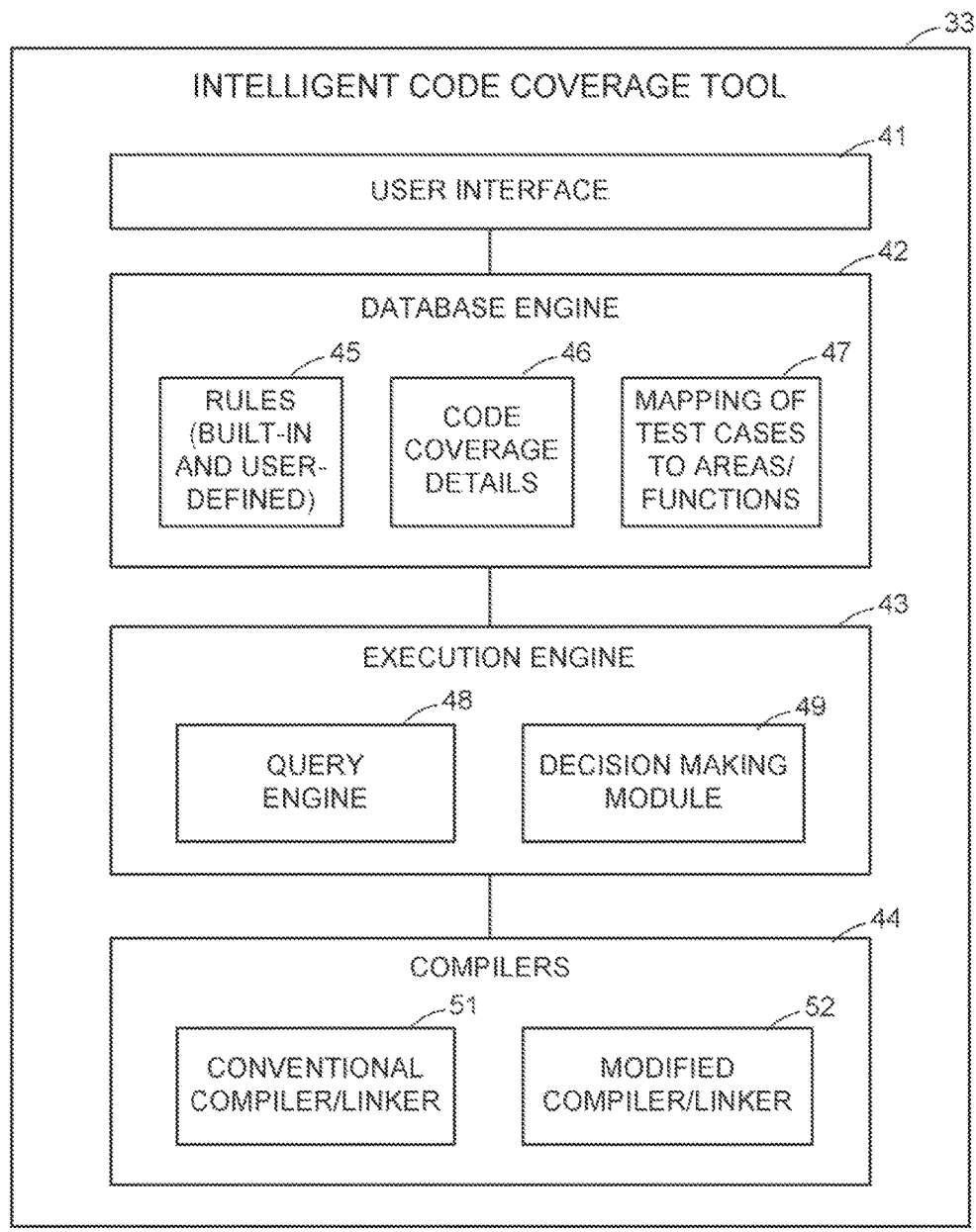
FIG. 2 illustrates an intelligent code coverage tool used with the digital computer of FIG. 1.

FIG. 2 shows an example of architecture of the intelligent code coverage tool 33. The intelligent code coverage tool 33 includes a user interface 41, a database engine 42, an execution engine 43, and compilers 44. The user interface 41 is used to input various data from the user, as further described below with reference to FIG. 3.

The database engine 42 stores rules 45 and code coverage details 46 for each test case. The rules 45 include built-in rules that prioritize selected ones of the test cases for execution at run time to provide code coverage maximization with minimum utilization of computer resources. The rules 45 may also include user-defined rules that specify how the user prefers the code coverage testing of the computer software to be run.

The database engine 43 also stores the mapping 47 of test cases to areas and functions. For example, the areas and functions are specified by file names and the names of functions, methods, or subroutines in the files. The areas or functions may also be specified in more general terms as understood by a user, in which case the mapping 47 maps these general terms to the names of particular application files or the names of functions within the particular application files. For example, for subject matter relating to data storage systems, the general terms may include backup, recovery, replication, and de-duplication.

During use of the intelligent code coverage tool 33, the database engine 42 takes user input from the user interface 41, and stores the user input or uses the user input to update the rules 45, code coverage details 46, or mapping 47. When the user input request a code coverage run to be performed, the database engine 42 feeds the applicable user input, rules, code coverage details, and mapping information to the execution engine 43, and the database engine 42 requests the execution engine 43 to determine an appropriate test case scenario.

The execution engine 43 includes a query engine 48 and a decision making module 49. When the execution engine 43 receives data and a request for a code coverage run, the query engine 48 formulates a query based on the data, and sends the query to the decision making module 49. The decision making module 49 finds a best possible way to run one or more of the test cases to get a percentage of code coverage specified by the user or else specified by a default value from the code coverage details 46. The decision making module 49 considers different combinations of the test cases and applies built-in or user-defined rules, along with the mappings of the test cases to areas or functions of interest to the user. For example, the decision making module 49 employs goal-directed backward chaining of the rules, as described in Erman et al. U.S. Pat. No. 4,658,370 issued Apr. 14, 1987, incorporated herein by reference in its entirety, and Hardy et al, U.S. Pat. No. 4,648,044 issued Mar. 3, 1987, incorporated herein by reference in its entirety. The decision making module 49 then executes the test case scenario with the best possible sequence of test case execution to achieve the desired percentage of code execution.

The compilers 44 include a conventional compiler and linker 51 and a modified compiler and liker 52. The mapping 44 of test cases to areas or functions 47 is used in connection with the user input to select (a) which executable files in the application code base for a build are compiled and linked by the conventional compiler and linker 51, and (b) which executable files in the application code base for a build are compiled and linked by the modified compiler/linker. The modified compiler and linker 52 is used to compile and link executable files mapped to areas and functions upon which code coverage testing is to be applied. The modified compiler 52 inserts assembly or machine-level instructions that set the flags in the coverage bitmap (38 in FIG. 1) during application program execution of the code coverage run.

If an executable file to be included in the build does not need to be tested for code coverage during the run, then the conventional compiler 51 compiles the executable file. For example, an executable file to be included in the build does not need to be tested for code coverage during the run because the executable file is a common subroutine, is provided in a function library associated with the conventional compiler/linker, or the executable file has not been modified since a previous release of the application program. If the user has specified a general term for the area or function to be tested for code coverage, then the database engine 42 accesses the mapping 47 to find the names of the executable files to be compiled by the modified compiler and linker 52.

Many of the rules 45 evolve around how to order the test cases to ensure maximum code coverage with minimum test case execution. The rules 45 may include rules to cover a single run of all the test cases of the major functionalities in one shot covering a maximum of the test cases. For example, a rule specifies that instead of running a backup and going into different variations in backup, run other major functionalities (e.g., recover, archive, clone) first, which ensures maximum coverage with fewer tests.

The rules 45 may include rules for test cases that specifically involve various types of operating systems, and prioritize test cases for a run with a WINDOWS operating system or a run with a UNIX operating system. As internally most UNIX operating systems will have similar implementations and control flows, the test cases are prioritized in this way in order to minimize the number of test cases.

The rules 45 may include rules to keep test cases involving repetitive runs on multiple machines based on test cases, low on priority. Although they contribute towards testing scalability and parallelism, they do not contribute much towards code coverage.

The rules 45 may include rules for test cases that contain operations that spawn similar processes internally, and these test cases should be kept low on priority to maximize code coverage.

The rules 45 may include rules for test cases that deal with operations that have a minimum number of inputs. These test cases can be done so that the access of the same piece of code can be avoided. For example, test cases that involve a single device/volume/clone/saveset may be run without branching into more complex scenarios.

Figure 3:
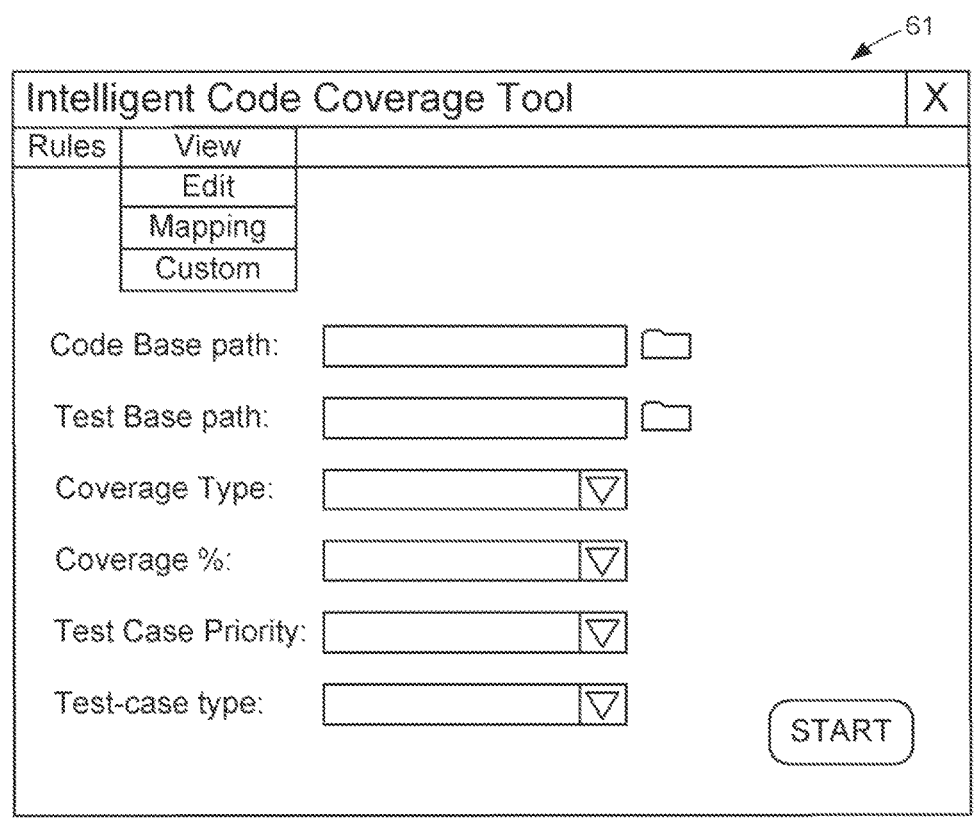
FIG. 3 illustrates a display screen of a user interface of the intelligent code coverage tool of FIG. 2.

FIG. 3 shows a display screen 61 that the user interface presents to the user. The display screen 61 provides respective fill-in fields for the user to enter a path name for a directory containing the application code base, a path name for a directory containing the test cases, a coverage type (specifying area, function, conditions and/or statements), a specified percentage of code coverage, a test case priority (specifying high, medium or low), and a test case type (specifying either unique or repetitive). The display screen 61 also provides drop-down menus to create, view, and edit customized rules, or view built-in rules, or set or map test cases with areas or functions. The display screen 61 also provides a button to start or run code coverage tests.

Figure 4:
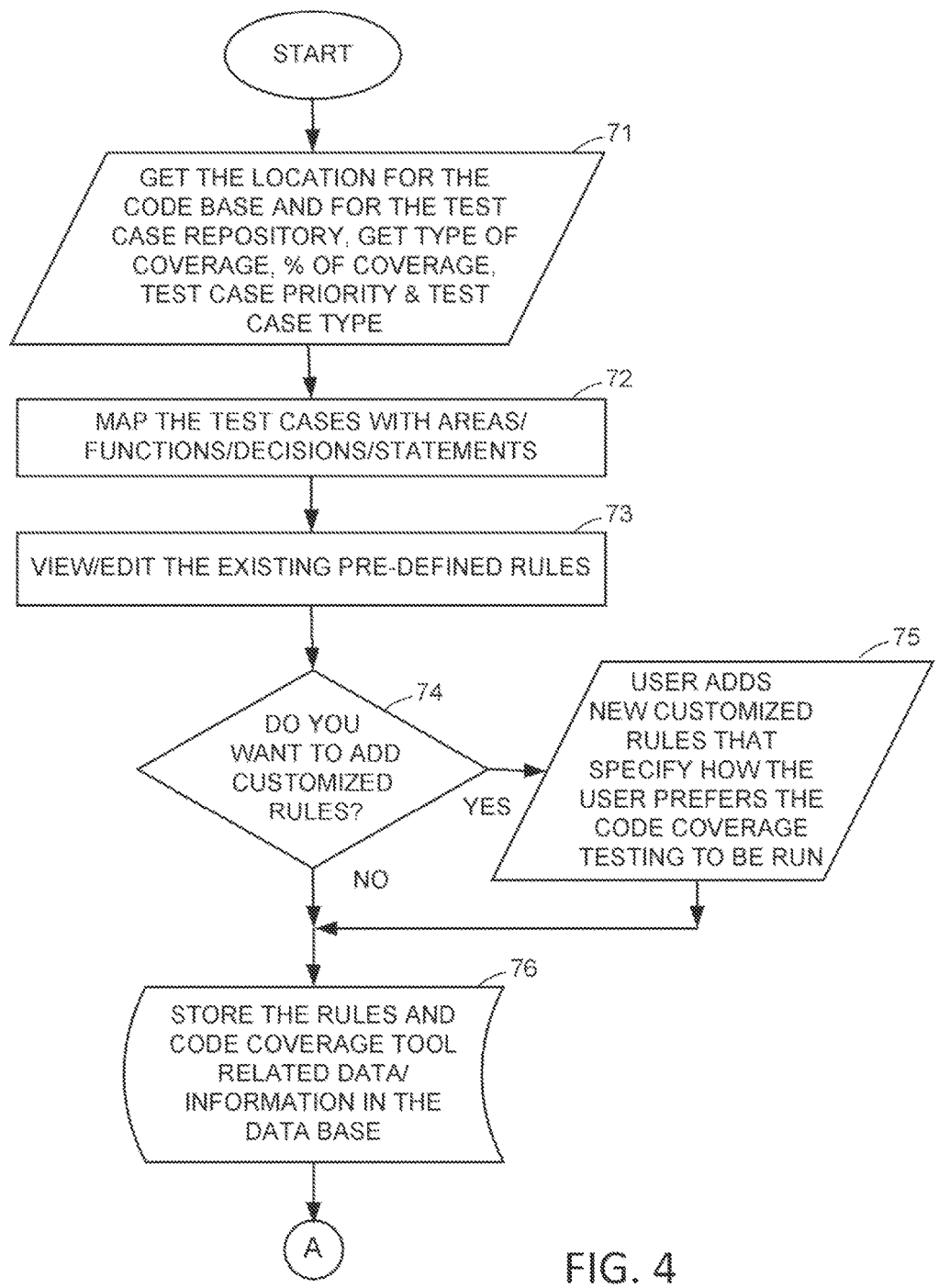
FIG. 4 and FIG. 5 together comprise a flowchart of operation of the intelligent code coverage tool of FIG. 2.
Figure 5:
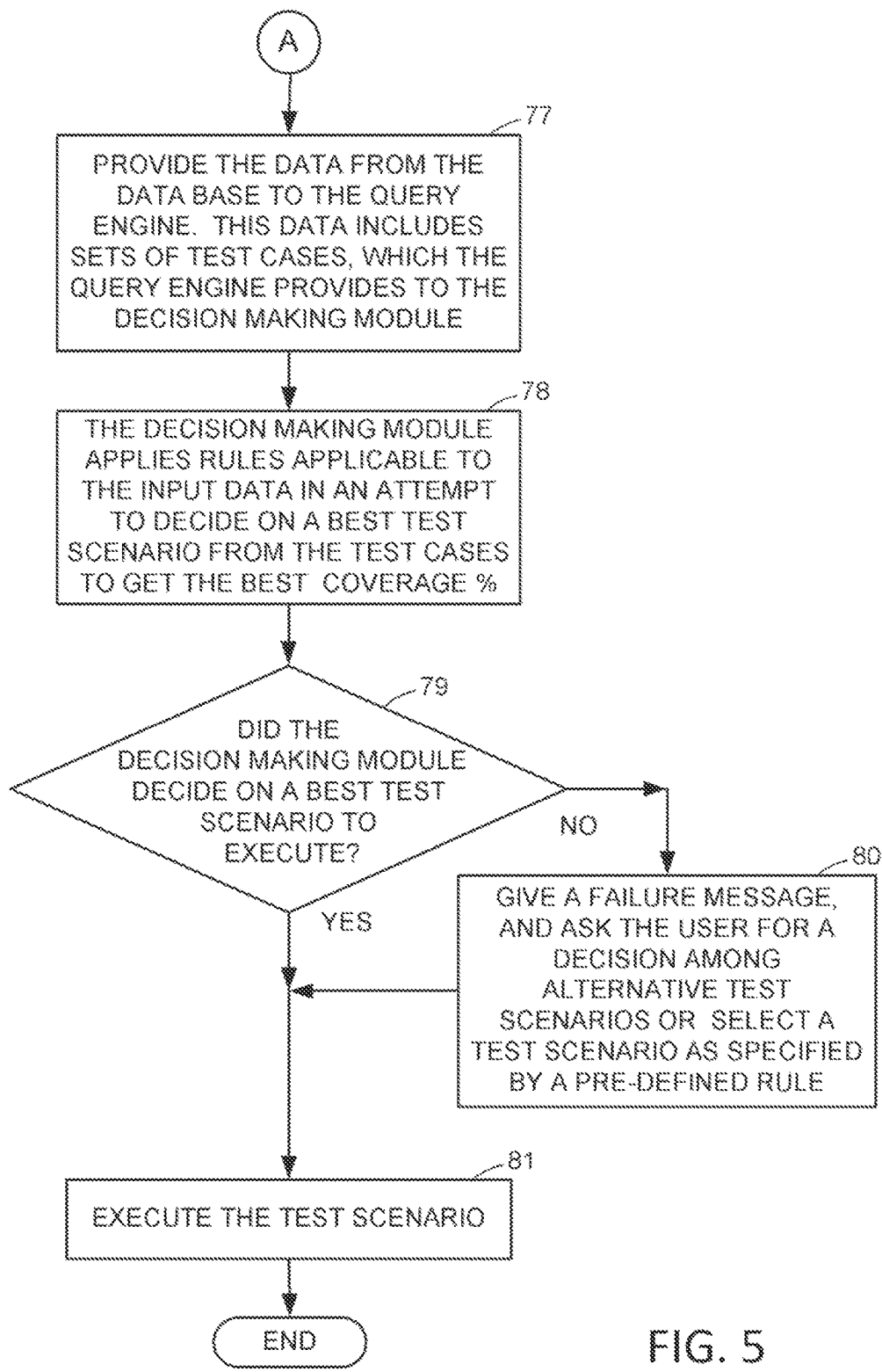

FIG. 4 and FIG. 5 together show an operation sequence of the intelligent code coverage tool. In a first block 71 in FIG. 4, the user interface of the intelligent code coverage tool receives input from the user. The input includes the location for the application code base and the location for the test case repository, the type of coverage, the desired percentage of coverage, the test case priority, and the test case type. In block 72, the user or the system maps the test cases with areas, functions, decisions, and statements. In block 73 the user views or edits the existing pre-defined rules. In block 74, if the user selects the option to add customized rules, then in block 75 the user adds new customized rules. The operation sequence continues from block 75 to block 76. The operation sequence also continues from block 74 to block 76 if the user does not select the option to add customized rules. In block 76, the rules and code coverage tool related data or information is stored in the data base of the data base engine. Execution continues form block 76 to block 77 of FIG. 5.

In block 77 of FIG. 5, the data base engine provides the data from the data base to the query engine. This data includes sets of test cases, which the query engine provides to the decision making module. In block 78, the decision making module applies rules applicable to the input data from the user in an attempt to decide on a best test scenario from the test cases to best achieve the code coverage goal. Typically the code coverage goal includes a target code coverage percentage from the user or from a built-in rule. It is also possible for the user or the rules to specify different respective target code coverage percentages for areas, functions, decisions, or statements. In block 79, if the decision making module does not decide on a best test scenario to execute, then execution branches to block 80 to give the user a failure message, and to ask the user for a decision among alternative test scenarios or to select a test scenario as defined by a pre-defined rule when there is no single best test scenario to execute and the user does not wish to make a decision. Execution continues from block 80 to block 81 to execute the test scenario. Execution also continues from block 79 to block 81 to execute the test scenario if the decision module decides on a best test scenario to execute. Once the test scenario is executed in block 81, the operation sequence for the code coverage test is finished.

For example, in block 78, the decision making module may find that there are two alternative test scenarios with equally likely performance, so that in block 80 the user interface would report the two alternative test scenarios to the user. If the user fails to select one of the two alternative test scenarios in block 80, then the intelligent code coverage tool would apply a pre-defined rule to select one of the two alternative test scenarios. For example, the pre-defined rule may select one of the two alternative test scenarios at random, by invoking a random number generator routine.

FIG. 6 shows an example of six possible test scenarios for code coverage testing of a data storage application. Different test scenarios may include similar test cases but execute the similar test cases in a different order or in combination with various other test cases. For example, the first scenario has a single test case of taking a backup of a client with one saveset. The second scenario has the same test case of taking a backup of a client with one saveset, and adds a following test case of running a file level recover operation with a command line interpreter once the backup is successful. The third scenario adds considerable complexity, by first taking a backup of a client with multiple savesets, and then once backup is successful, manually cloning the savesets to a secondary device, and then running a recover operation upon all of the savesets.

The fourth scenario includes a first test case of taking a backup of a client with multiple savesets by enabling an auto-clone feature, followed by a second test case of recovering data from a primary storage device as well as recovering data from a secondary storage device. The fifth scenario includes a first test case of taking backup of multiple clients with multiple savesets by enabling the auto-clone feature, followed by a second test case of running file level recovery as well as image level recovery of every saveset, followed by a third test case of running a redirected restore and running a relocated restore. The sixth scenario includes a first test case of taking a backup of a client with multiple savesets to different types of storage devices (such as file type devices, AFTD devices, Data Domain devices, tape, etc.), followed by a second test case of running file level recovery as well as image level recovery of every saveset.

As shown in FIG. 6, the expected result of each test case in each of the six test scenarios is that the test case should be successful. However, there could be test cases for which it would be normal and expected for a test case to result in an unsuccessful operation. For example, it would be normal and expected for a password-protected storage device to deny access when presented with a randomly-generated password.

In one implementation, the decision making module first selects a particular one of multiple pre-defined goal-directing rules based on user input, and then applies other applicable rules to select or construct a series of the test cases that best meets the objective of the particular goal-directing rule. For example, the multiple goal-directing rules may include the following:

1. Run minimum number of test-cases that can give greater than 70% of code coverage.

2. Run minimum number of test-cases that can cover an area (example: backup, recover) up to 80-90%. of code coverage.

3. Run minimum number of test-cases that can give maximum code coverage for high priority test-cases.

4. Run minimum number of test-cases which can cover a specified maximum percentage (provide by user or else a default value of 80%) of functions in a given area.

For example, assume that the user interface receives the following inputs from the user:

a. Code Base Path
b. Test-cases Path.
c. Coverage Type is Area.
d. Coverage % is 70.
e. Test-Case Priority is high.
f. Test-Case Type is Unique.
g. A user-defined rule to pick the minimum number of test-cases that can cover "x" percentage provided as user input, and the user specifies 70%.

In response to this user input, the database engine sends the applicable data to the query engine, and the query module formulates and sends an appropriate query to the decision making module. In response to the query, the decision making module applies the applicable rules (either user-defined or predefined). In this example, the query is the goal of the user defined rule (i.e., get the minimum number of test-cases that can cover up to 70% of the code having all high priority test-cases and unique ones).

For example, there are fifteen high priority test-cases in an area called "backup", And the decision making module finds two different sets of test cases that can be executed to achieve 70% of the code coverage. The following is an example of the corresponding first set of test cases:

1. A full backup of a volume saveset and recover the same.
2. An incremental backup of a volume saveset and recover the same.
3. A Synthetic full of a volume saveset and recover the same.
4. A Virtual full backup of a volume saveset and recover the same.
5. Maximum number of supported incremental backups of a volume as a saveset and recover the same.
6. Take a backup and verify that the memory information provides information on the levels and type of backup properly.
7. Take a level full backup of a granular saveset and recover the same.
8. A backup of volumes having different types of file systems and recover the same.
9. Backup of volume as a saveset to all the different types of backup devices that are supported and recover the same.
10. Backup multiple clients having multiple volumes as savesets & granular savesets and recover the same.

The following is an example of the second set of test cases:

1. A Synthetic full of a volume saveset and recover the same.
2. Maximum number of supported incremental backups of a volume as a saveset and recover the same.

3. A Virtual full backup of a volume saveset and recover the same.
4. Maximum number of supported incremental backups of a volume as a saveset and recover the same.
5. Take a level full backup of a granular saveset and recover the same.
6. Backup multiple clients having multiple volumes as savesets & granular savesets and recover the same.

Based on the user defined goal-directing rule, a minimum number of test-cases are needed that can cover 70% of the code of "backup" area. Therefore the decision making engine selects the second set of test-cases since 70% of code would be covered with just six test-cases.

For example, the decision making module selects the second set of test cases by applying rules in accordance with the following procedure:

1. Get the input data from the user interface and other applicable information from the database engine and query engine.

2. Apply the rules after getting all the test cases from the database engine.
For each test case from the database engine {
If (test-case area=="backup") then
Add this as part of execution
Else
Discard this test-case.
}

3. Now check if every test-case is a unique one
For each test-case added as part of execution list {
If (test-case="unique") then
Add this as part of execution
Else
Discard this test-case
}

4. Check if the total execution of these set of test-cases in the execution list can provide a code coverage of 70%
Each of the unique test-cases, are checked by applying bulls eye {
If (test-case-list gives >=70%) then
Add this list as part of execution
Else
Discard this test-case execution list
}

5. Now if there are multiple lists of test-cases then finalize with one that has the minimum number of test-cases:
Smallest-List=Size (test-case-list −1)
For each test-case execution list added as part of execution {
If (Size (NEXT-test-case-list)<Smallest-List) then
Smallest-List=Size (NEXT-test-case-list)
} //The next list is picked and compared every time with the smallest list//

Finally, the Smallest-List is selected as the execution list having the minimum number of test-cases that can provide code coverage of up-to 70%.

Although the code coverage testing has been described above with respect to a digital computer (21 in FIG. 1) such as a personal computer or workstation, the code coverage testing can be performed in other general purpose or specialized computing devices, such as desktop or laptop computers, or mainframe computers, as well as cellular, wireless, and handheld devices running mobile software and capable of supporting a number of networking and messaging protocols. The code coverage testing can be performed in a distributed system including any number of workstations running any of a variety of commercially-available operating systems and other known applications for purposes such as development and database management. These devices also can include other electronic devices, such as dummy terminals, thin-clients, gaming systems, and other devices capable of communicating via a network.

Embodiments may utilize at least one network that would be familiar to those skilled in the art for supporting communications using any of a variety of commercially-available protocols, such as TCP/IP, FTP, SFTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java® servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle*, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for performing code coverage testing of computer software, the method comprising:
    storing a plurality of predefined test cases;
    receiving input data from a human user, the input data defining a code coverage goal;
    selecting as a test scenario a set of at least one of the stored predefined test cases, comprising applying predefined rules applicable to the input data to determine the test scenario from the stored plurality of predefined test cases to best achieve the code coverage goal; and
    running the computer software to perform the selected test scenario;
    wherein the predefined rules include built-in rules that prioritize the test scenario for execution at run time that meets the code coverage goal with a minimum number of test cases in the set that defines the test scenario;
    wherein the code coverage goal is a degree of testing that is less than complete testing of the computer software.

2. The computer-implemented method as claimed in claim 1, wherein the input data received from the user includes a selection of a type of coverage, a selection of a test case priority, and a selection of a test case type, and the application of the predefined rules applies predefined rules that are applicable to the selected type of coverage and the selected test case priority and the selected test case type in order to determine the test case scenario from predetermined test cases of the selected test case type to best achieve the code coverage goal.

3. The computer-implemented method as claimed in claim 1, which includes the user inputting a code coverage percentage that defines the code coverage goal.

4. The computer-implemented method as claimed in claim 3, which includes providing the user with an option to specify that the code coverage percentage is applicable to predefined areas, functions, conditions, or statements of the computer software, and in response to the user specifying that the code coverage percentage is applicable to predefined areas, conditions, or statements of the computer software, the predefined rules are applied to determine the test scenario from the predefined test cases to best achieve the code coverage percentage over the particular predefined areas, functions, conditions, or statements of the computer software.

5. The computer-implemented method as claimed in claim 1, which further includes mapping areas and functions of the computer software to particular ones of the test cases that test the areas and functions of the computer software, and wherein the input data from the user specifies particular ones of the areas and functions that are of interest to the user, and which further includes using the mapping of the areas and functions of the computer software to map the particular ones of the areas and functions that are of interest to the user to test cases that test the particular ones of the areas and functions that are of interest to the user, and wherein the application of the rules applicable to the input data determines a test scenario from the test cases that test the particular ones of the areas and functions that are of interest to the user to best achieve the code coverage goal.

6. The computer-implemented method as claimed in claim 1, wherein the user input supplies a rule defined by the user, and the rule defined by the user specifies how the user prefers the code coverage testing of the computer software to be run, and the application of the predefined rules applies the rule defined by the user so that the test scenario is in accordance with how the user prefers the code coverage testing of the software to be run.

7. The computer-implemented method as claimed in claim 1, further comprising applying the built-in rules in an attempt decide upon a best one of alternative test scenarios, and in response to the failure to decide on a best one of the alternative test scenarios, the user is asked for a decision, and upon receiving a decision from the user, the computer software is run to perform a test scenario in accordance with the decision from the user.

8. A computing system, comprising:
at least one processor; and
memory including instructions that, when executed by the at least one processor, cause the computing system to perform code coverage testing of computer software by:
storing a plurality of predefined test cases;
receiving input data from a human user, the input data defining a code coverage goal; and
selecting as a test scenario a set of at least one of the stored predefined test cases, comprising applying predefined rules applicable to the input data to determine the test scenario from the stored plurality of predefined test cases to best achieve the code coverage goal; and
running the computer software to perform the selected test scenario;
wherein the predefined rules include built-in rules that prioritize the test scenario for execution at run time that meets the code coverage goal with a minimum utilization of computer resources number of test cases in the set that defines the test scenario;
wherein the code coverage goal is a degree of testing that is less than complete testing of the computer software.

9. The computing system as claimed in claim 8, wherein the input data received from the user includes a selection of a type of coverage, a selection of a test case priority, and a selection of a test case type, and the application of the predefined rules applies predefined rules that are applicable to the selected type of coverage and the selected test case priority and the selected test case type in order to determine the test case scenario from predetermined test cases of the selected test case type to best achieve the code coverage goal.

10. The computing system as claimed in claim 8, wherein the instructions, when executed by the at least one processor, cause the at least one processor to receive, in the user input, a code coverage percentage that defines the code coverage goal.

11. The computing system as claimed in claim 10, wherein the instructions, when executed by the at least one processor, cause the at least one processor to provide the user with an option to specify that the code coverage percentage is applicable to particular predefined areas, functions, conditions, or statements of the computer software, and when the user specifies that the code coverage percentage is applicable to predefined areas, conditions, or statements of the computer software, the predefined rules are applied to determine the test scenario from the predefined test cases to best achieve the code coverage percentage over the particular predefined areas, functions, conditions, or statements of the computer software.

12. The computing system as claimed in claim 8, wherein the instructions, when executed by the at least one processor, cause the at least one processor to store a mapping of areas and functions of the computer software to particular ones of the test cases that test the areas and functions of the computer software, and wherein the input data from the user specifies particular ones of the areas and functions that are of interest to the user, and wherein the instructions, when executed by the at least one processor, cause the at least one processor to use the mapping of the areas and functions of the computer software to map the particular ones of the areas and functions that are of interest to the user to test cases that test the particular ones of the areas and functions that are of interest to the user, and cause the at least one processor to determine the test scenario from the test cases that test the particular ones of the areas and functions that are of interest to the user to best achieve the code coverage goal.

13. The computing system as claimed in claim 8, wherein the computer instructions, when executed by the user, cause the application of the predefined rules to apply a rule defined by the user so that the test scenario is in accordance with how the user prefers the code coverage testing of the software to be run.

14. The computing system of claim 8, wherein the instructions further comprise applying the built-in rules in an attempt decide upon a best one of alternative test scenarios, and in response to the failure to decide on a best one of the alternative test scenarios, the user is asked for a decision, and upon receiving a decision from the user, the computer software is run to perform a test scenario in accordance with the decision from the user.

15. A non-transitory computer readable storage medium storing one or more sequences of instructions executed by one or more processors to cause the one or more processors to perform code coverage testing of computer software by:
storing a plurality of predefined test cases;
receiving input data from a human user, the input data defining a code coverage goal; and
selecting as a test scenario a set of at least one of the stored predefined test cases, comprising applying predefined rules applicable to the input data to determine the test scenario from the stored plurality of predefined test cases to best achieve the code coverage goal; and
running the computer software to perform the selected test scenario;

wherein the predefined rules include built-in rules that prioritize the test scenario for execution at run time that meets the code coverage goal with a minimum utilization number of test cases in the set that defines the test scenario;

wherein the code coverage goal is a degree of testing that is less than complete testing of the computer software.

16. The non-transitory computer readable storage medium as claimed in claim 15, wherein the input data received from the user includes a selection of a type of coverage, a selection of a test case priority, and a selection of a test case type, and the application of the predefined rules applies predefined rules that are applicable to the selected type of coverage and the selected test case priority and the selected test case type in order to determine the test case scenario from predetermined test cases of the selected test case type to best achieve the code coverage goal.

17. The non-transitory computer readable storage medium as claimed in claim 15, wherein the instructions, when executed by the one or more processors, cause the one or more processors to provide the user with an option to specify that a code coverage percentage is applicable to particular predefined areas, functions, conditions, or statements of the computer software, and when the user specifies that a code coverage percentage is applicable to predefined areas, conditions, or statements of the computer software, the predefined rules are applied to determine the test scenario from the predefined test cases to best achieve the code coverage percentage over the particular predefined areas, functions, conditions, or statements of the computer software.

18. The non-transitory computer readable storage medium as claimed in claim 15, wherein the instructions, when executed by the one or more processors, cause the one or more processors to store a mapping of areas and functions of the computer software to particular ones of the test cases that test the areas and functions of the computer software, and wherein the input data from the user specifies particular ones of the areas and functions that are of interest to the user, and wherein the instructions, when executed by the one or more processors, cause the one or more processors to use the mapping of the areas and functions of the computer software to map the particular ones of the areas and functions that are of interest to the user to test cases that test the particular ones of the areas and functions that are of interest to the user, and cause the one or more processors to determine the test scenario from the test cases that test the particular ones of the areas and functions that are of interest to the user to best achieve the code coverage goal.

19. The non-transitory computer readable storage medium as claimed in claim 15, wherein the computer instructions, when executed by the one or more processors, cause the one or more processors to apply built-in rules in an attempt decide upon a best one of alternative test scenarios, and in response to the application of the built-in rules fails to decide on a best one of the alternative test scenarios, to ask the user is asked for a decision, and when a decision is received from the user, to run the computer software to perform a test scenario in accordance with the decision from the user.

* * * * *